United States Patent
Tanabe

(10) Patent No.: US 9,529,225 B2
(45) Date of Patent: Dec. 27, 2016

(54) LIQUID CRYSTAL DISPLAY DEVICE AND METHOD OF MANUFACTURING A LIQUID CRYSTAL DISPLAY DEVICE

(71) Applicant: Japan Display Inc., Tokyo (JP)

(72) Inventor: Atsushi Tanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/620,094

(22) Filed: Feb. 11, 2015

(65) Prior Publication Data

US 2015/0241721 A1 Aug. 27, 2015

(30) Foreign Application Priority Data

Feb. 21, 2014 (JP) ................. 2014-031367

(51) Int. Cl.
*G02F 1/1335* (2006.01)
*F21V 8/00* (2006.01)

(52) U.S. Cl.
CPC ... *G02F 1/133514* (2013.01); *G02F 1/133512* (2013.01); *G02B 6/0065* (2013.01); *G02F 2203/11* (2013.01)

(58) Field of Classification Search
CPC ................ G02F 1/133514; G02F 1/133512; G02F 2203/11; G02B 6/0065
See application file for complete search history.

(56) References Cited

U.S. PATENT DOCUMENTS

2010/0171900 A1* 7/2010 Lee .............. G02B 6/0051 349/58
2013/0293804 A1* 11/2013 Kim .............. G02F 1/133308 349/58
2015/0331279 A1* 11/2015 Kimura .............. G02B 5/201 349/42

FOREIGN PATENT DOCUMENTS

JP 2008-242193 A 9/2008
JP 2014-26200 A 6/2014
JP WO 2014115367 A1 * 7/2014 ............. G02B 5/201

* cited by examiner

*Primary Examiner* — Donald Raleigh
(74) *Attorney, Agent, or Firm* — TYPHA IP LLC

(57) ABSTRACT

A liquid crystal display device, includes: a liquid crystal display panel having a first substrate and a second substrate with a display area and a non-display area; a backlight that irradiates the liquid crystal display panel with light; an adhesive layer that adheres the liquid crystal display panel to the backlight; a first polarizing plate stuck onto the first substrate; and a second polarizing plate stuck onto the second substrate, in which an outer edge of the second polarizing plate is located outside an outer edge of the second substrate, a light impermeable film and an alignment mark part are formed in the non-display area of the first substrate, and the light impermeable film and the alignment mark part are different in infrared transmittance or infrared reflectance.

7 Claims, 4 Drawing Sheets

LIQUID CRYSTAL DISPLAY DEVICE AND METHOD OF MANUFACTURING A LIQUID CRYSTAL DISPLAY DEVICE

CROSS-REFERENCE TO RELATED APPLICATION

The present application claims priority from Japanese Application JP 2014-031367 filed on Feb. 21, 2014, the content of which is hereby incorporated by reference into this application.

BACKGROUND OF THE INVENTION

1. Field of the Invention

The present invention relates to a liquid crystal display device and a method of manufacturing the liquid crystal display device.

2. Description of the Prior Art

As a display device for information communication terminals such as a computer and television receivers, liquid crystal display devices having a backlight and a liquid crystal display panel have been extensively used. In recent years, the liquid crystal display devices are used particularly in cellular phones and smartphones. The liquid crystal display devices need to be downsized, narrowed in frame, and simplified in a manufacturing process.

The liquid crystal display panel includes two substrates having a display area between which liquid crystal is confined, and a lower polarizing plate and an upper polarizing plate which are attached to the respective substrates. The liquid crystal display panel is fixed to the backlight by an adhesive tape arranged on a lower surface of the lower polarizing plate. The liquid crystal display panel changes the orientation of liquid crystal molecules confined between the two substrates to change a transmission degree of a light irradiated from the backlight onto the liquid crystal display panel for displaying an image.

As the liquid crystal display device, for example, JP 2008-242193 A discloses a configuration in which a lower polarizing plate larger in a planar view shape than the substrate is attached onto a lower surface of the substrate.

SUMMARY OF THE INVENTION

With the requirements for ensuring the display area, an area in which the adhesive tape is arranged is required to be arranged on an outside as much as possible. However, if the area in which the adhesive tape is arranged is too small, an adhesion between the backlight and the liquid crystal display panel is reduced.

In the liquid crystal display device disclosed in JP 2008-242193 A, the outer periphery of the lower polarizing plate is located outside the outer periphery of the substrate in a planar view. For that reason, the adhesive tape can be arranged outside the display area in a planar view. However, in the above liquid crystal display device, the outer periphery of the lower polarizing plate is located outside the outer periphery of the substrate. For that reason, the outer periphery of the liquid crystal display panel is aligned with the outer periphery of the backlight to decrease a precision of positioning the display area and the backlight. Also, in the liquid crystal display panel disclosed in JP 2008-242193 A, the lower polarizing plate covers the overall lower surface of the substrate. This leads to such a problem that alignment with the use of an alignment mark cannot be performed.

The present invention has been made in view of the above circumstances, and aims at realizing a method of manufacturing a liquid crystal display device that can ensure a display area, and performs the alignment with high precision.

An outline of a typical feature of the invention disclosed in the present application will be described in brief below.

(1) According to the present invention, there is provided a liquid crystal display device, including: a liquid crystal display panel having a first substrate and a second substrate with a display area and a non-display area; a backlight that irradiates the liquid crystal display panel with light; an adhesive layer that adheres the liquid crystal display panel to the backlight; a first polarizing plate stuck onto the first substrate; and a second polarizing plate stuck onto the second substrate, in which an outer edge of the second polarizing plate is located outside an outer edge of the second substrate, a light impermeable film and an alignment mark part are formed in the non-display area of the first substrate, and the light impermeable film and the alignment mark part are different in infrared transmittance or infrared reflectance.

(2) According to the present invention, in the liquid crystal display device according to the item (1), a color filter having a colored film may be disposed in the display area of the first substrate, and the colored film may be formed in the alignment mark part.

(3) According to the present invention, in the liquid crystal display device according to the item (1), a second alignment mark part different in the infrared transmittance or infrared reflectance from the alignment mark part may be formed inside the alignment mark part in a planar view.

(4) According to the present invention, there is provided a liquid crystal display device, including: a liquid crystal display panel having a first substrate and a second substrate with a display area and a non-display area; a backlight; an adhesive layer that adheres the liquid crystal display panel to the backlight; a light impermeable film formed in the non-display area of the first substrate; an upper polarizing plate stuck onto the first substrate; and a lower polarizing plate stuck onto the second substrate, in which an outer edge of the lower polarizing plate is located outside an outer edge of the second substrate, at least a part of the adhesive layer is arranged to overlap with an area outside of the outer edge of the second substrate in a planar view, and an opening is formed in the light impermeable film.

(5) According to the present invention, in the liquid crystal display device according to the item (4), a colored film different in an infrared transmittance or infrared reflectance from the light impermeable film may be formed within the opening.

(6) According to the present invention, in the liquid crystal display device according to the item (4), the opening may be an alignment mark part.

(7) According to the present invention, in the liquid crystal display device according to the item (5), a color filter having a colored film may be formed in the display area, and the colored film formed within the opening may be made of the same material as that of the colored film of the color filter.

DETAILED DESCRIPTION OF THE INVENTION

Hereinafter, a liquid crystal display device 1 according to this embodiment will be described with reference to the accompanying drawings. The drawings referred to in the following description may illustrate a characteristic part in an enlarged manner for the convenience of understanding, and the ratio of the dimension of each constituent element may not be the same as the actual ratio. Materials and the like exemplified in the following description are mere examples and respective constituent elements may be different from them and may be embodied by being changed in an extent that does not alter the gist thereof.

Figure 1:
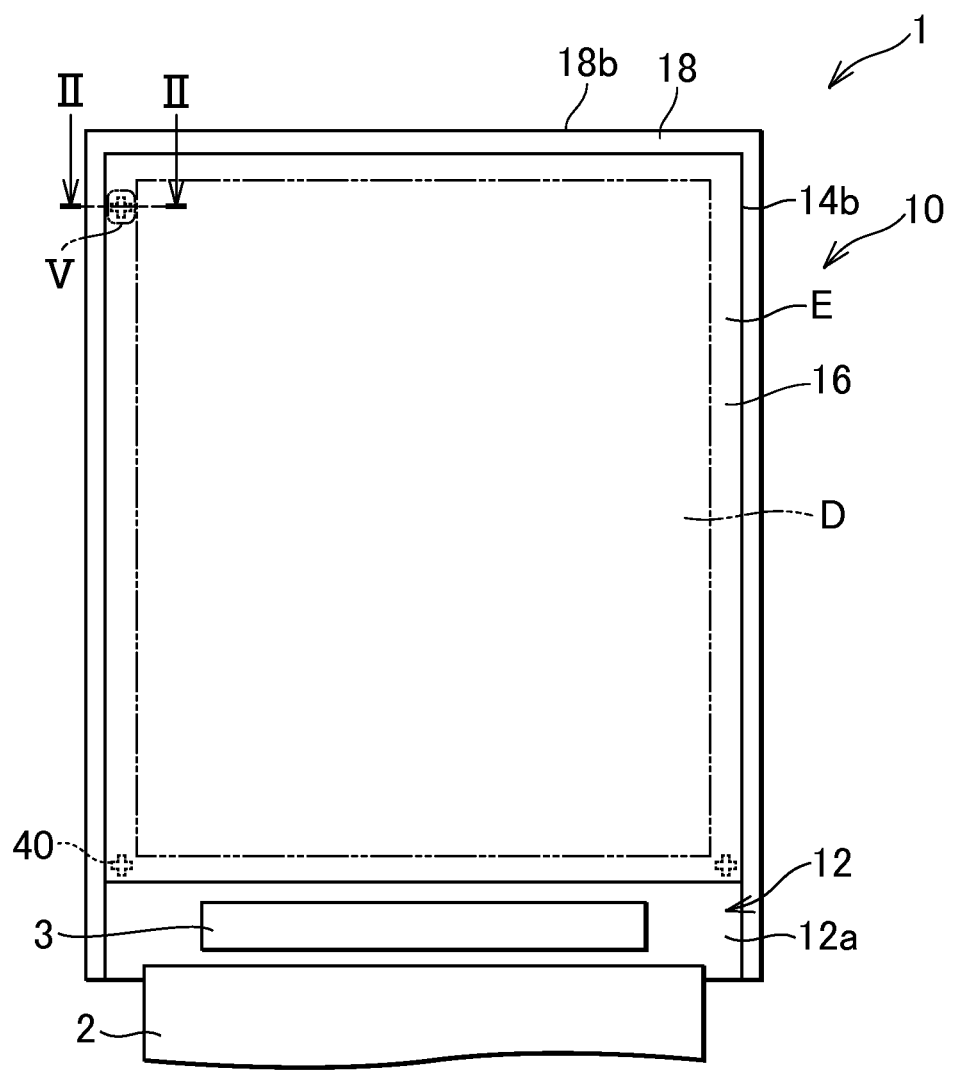
FIG. 1 is a schematic planar view of a liquid crystal display device according to an embodiment of the present invention.
Figure 2:
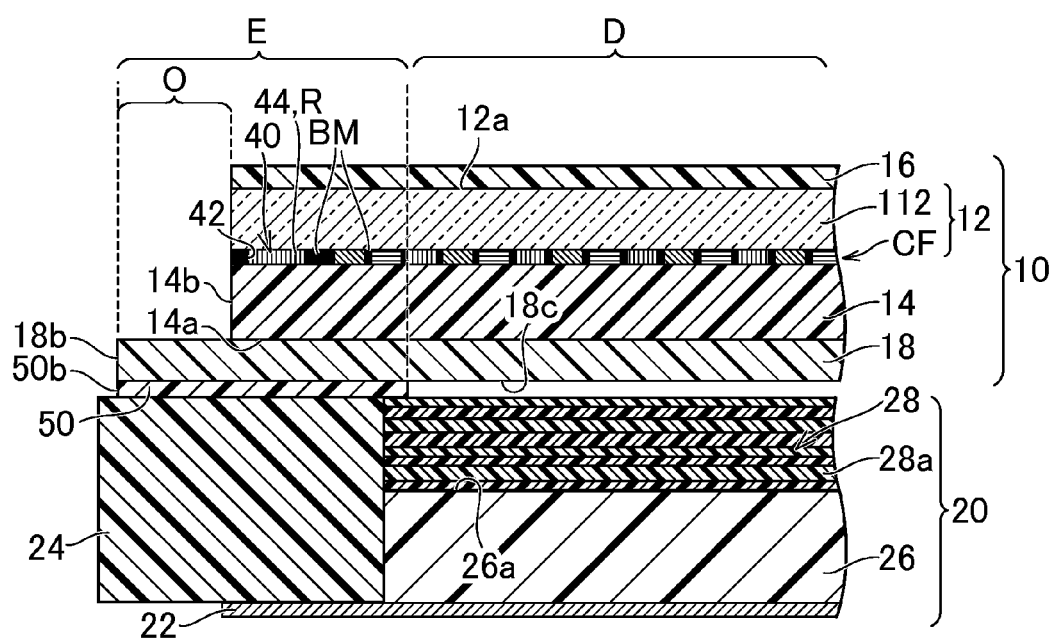
FIG. 2 is a schematic cross-sectional view of the liquid crystal display device illustrated in FIG. 1 taken along a line II-II.
Figure 2:
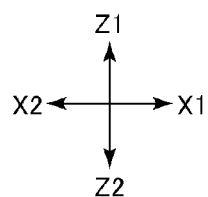
Figure 3:
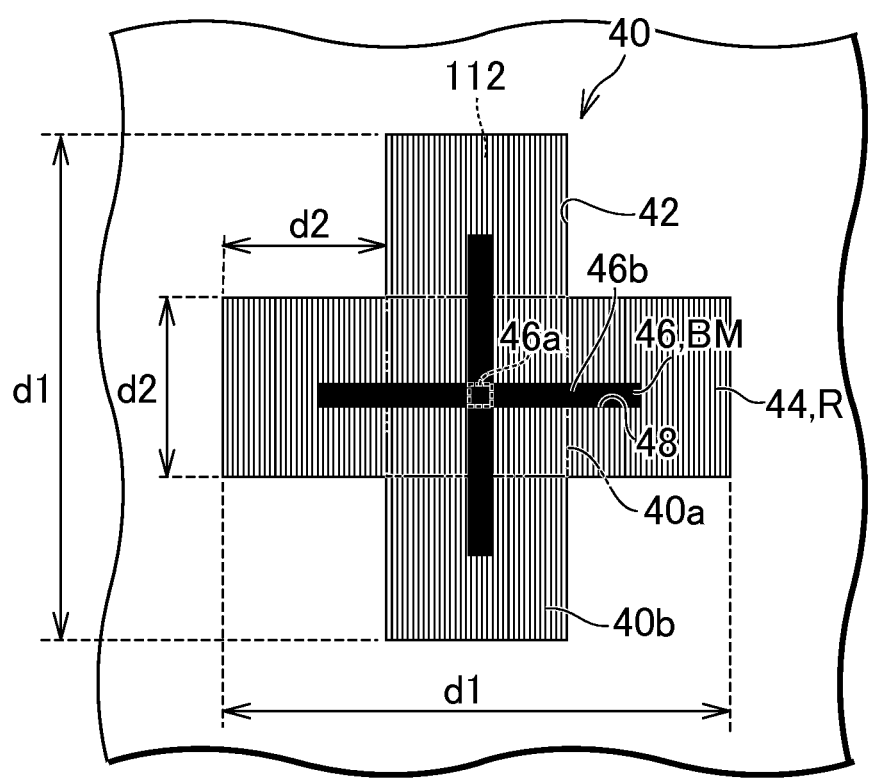
FIG. 3 is a partially enlarged view of an area III in the liquid crystal display device illustrated in FIG. 1.

FIG. 1 is a schematic planar view of the liquid crystal display device 1 according to an embodiment of the present invention, FIG. 2 is a schematic cross-sectional view taken along a line II-II of the liquid crystal display device 1 illustrated in FIG. 1, and FIG. 3 is a partially enlarged view of an area III in the liquid crystal display device 1 illustrated in FIG. 1.

First, a schematic configuration of the liquid crystal display device 1 will be described. As illustrated in FIGS. 1 and 2, the liquid crystal display device 1 according to this embodiment includes a backlight 20, a liquid crystal display panel 10 adhered over (in a Z1-direction of FIG. 2) the backlight 20 with an adhesive layer 50, a flexible wiring substrate 2, and a driver IC 3. In this embodiment, for convenience of description, a positional relationship of the respective configurations will be described with the use of coordinates of an X-axis (X1-direction, X2-direction), a Y-axis (Y1-direction, Y2-direction), and a Z-axis (Z1-direction, Z2-direction).

For convenience of the description, the configuration of the backlight 20 will be described prior to the configuration of the liquid crystal display panel 10. The backlight 20 is a member that irradiates the liquid crystal display panel 10 with light. As illustrated in FIG. 2, the backlight 20 includes a reflection sheet 22, a frame 24, a light guide plate 26, and an optical member 28.

The frame 24 is a member on which the adhesive layer 50 is arranged. The frame 24 is formed of, for example, a molded frame-like resin. The frame 24 is covered with a plate-like member not shown on a lower side (Z2-direction side of FIG. 2) thereof. With the above configuration, the reflection sheet 22, the light guide plate 26, the optical member 28, and light emitting elements not shown can be accommodated inside of the frame 24 and the plate-like member.

The reflection sheet 22 is a sheet that reflects a light input from the light emitting elements toward the light guide plate 26 toward the liquid crystal display panel 10 side. The reflection sheet 22 is arranged to cover a lower side (Z2-direction side) of the light guide plate 26. The material of the reflection sheet 22 is not particularly limited, but a material higher in optical reflectance is preferable, and a metal film made of, for example, aluminum is used.

The light guide plate 26 emits the light from the light emitting elements not shown from an upper surface 26a thereof (a surface on the Z1-direction side of the light guide plate 26) toward a display area D. The light guide plate 26 is made of a transparent resin such as acrylic, but may be made of a material other than acrylic if the material has translucency.

The light emitting elements can be formed of, for example, light emitting diodes. The light emitting elements are arranged on a side surface of the light guide plate 26 whereby the light emitted from the light emitting elements is transferred to an interior of the light guide plate 26, and emitted from the upper surface 26a. As a result, the upper surface 26a of the light guide plate 26 functions as a surface light source.

The optical member 28 is arranged over the light guide plate 26 (Z1-direction side). The optical member 28 controls the angular distribution and diffusion of the light emitted from the upper surface 26a of the light guide plate 26. The optical member 28 is formed by laminating plural optical sheets 28a. The optical member 28 is disposed so as to cover the upper surface 26a of the light guide plate 26.

With the above configuration, the light emitted from the upper surface 26a of the light guide plate 26 is transmitted to the liquid crystal display panel 10 disposed over (Z1-direction side) the optical member 28 through the optical member 28.

Then, the configuration of the liquid crystal display panel 10 will be described. The liquid crystal display panel 10 is configured to control the transmittance of the light emitted from the backlight 20 to display a desired image on a top surface thereof. As illustrated in FIG. 2, the liquid crystal display panel 10 is adhered over the backlight 20 (Z1-direction) with the adhesive layer 50.

As illustrated in FIG. 2, the liquid crystal display panel 10 includes a first substrate 12, liquid crystal not shown, a second substrate 14, a first polarizing plate (upper polarizing plate 16), and a second polarizing plate (lower polarizing plate 18). Hereinafter, the details of the respective configurations will be described.

The first substrate 12 is, for example, a color filter substrate having a glass substrate 112 and a color filter CF. With the use of the color filter substrate as the first substrate 12, the liquid crystal display device 1 enables color display. The first substrate 12, as illustrated in FIGS. 1 and 2, has the display area D and a non-display area E.

In the display area D of the first substrate 12, the color filter CF is formed. The color filter CF includes a light impermeable (opaque) film BM having a light shielding property such as a black matrix, which is disposed on a lower surface (surface on the Z2-direction side) of the glass substrate 112 in a mesh, and colored films R, G, and B sectioned into a matrix by the light impermeable film BM of the meshed shape. The colored films R, G, and B are higher in the light transmittance than the light impermeable film BM, and higher in the transmittance of the light having a particular wavelength than the light transmittance of other wavelengths.

The colored films R, G, and B are made of resin colored with, for example, a pigment. In this embodiment, in the colored films R, G, and B, for example, a red colored film R, a green colored film G, a blue colored film B are formed according to each pixel.

The light impermeable film BM is formed in the non-display area E of the first substrate 12. For convenience of the description, the detailed configuration of the non-display area E will be described later.

The second substrate 14 is configured to hold liquid crystal between the second substrate 14 and the first substrate 12, and faces the first substrate 12. The liquid crystal not shown is sealed between the first substrate 12 and the second substrate 14. The second substrate 14 is formed of, for example, a TFT (thin film transistor) substrate. The second substrate 14 is sectioned into the display area D and the non-display area E outside of the display area D, and thin film transistors not shown are formed in the display area D.

The upper polarizing plate 16 is stuck onto an upper surface 12a (surface on the Z1-direction side) of the first substrate 12. The lower polarizing plate 18 larger in a planar view shape than the second substrate 14 is stuck onto a lower surface 14a (surface on the Z2-direction side) of the second substrate 14. As illustrated in FIGS. 1 and 2, an outer edge 18b of the lower polarizing plate 18 is located outside of an outer edge 14b of the second substrate 14 in a planar view.

A lower surface 18c (surface on the Z2-direction side) of the lower polarizing plate 18 is fixed over the backlight 20 (frame 24) with the adhesive layer 50. Also, the adhesive layer 50 is arranged to at least partially overlap with an area outside of the outer edge 14b of the second substrate 14 in the planar view.

Specifically, as illustrated in FIG. 2, the adhesive layer 50 is arranged so that its outer edge (outer edge on the X2-direction side in FIG. 2) 50b is located outside (on the X2-direction side in FIG. 2) of the outer edge 14b of the second substrate 14. With this configuration, a part of the adhesive layer 50 overlaps with the lower polarizing plate 18 in an area O outside of the outer edge 14b of the second substrate 14 in the planar view.

The liquid crystal display device 1 according to this embodiment is arranged in such a manner that the outer edge 18b of the lower polarizing plate 18 is located outside of the outer edge 14b of the second substrate 14, and at least a part of the adhesive layer 50 overlaps with the area O outside of the outer edge 14b of the second substrate 14 in the planar view. With this configuration, as compared with the liquid crystal display device without this configuration, in the liquid crystal display device 1 according to this embodiment, the adhesive layer 50 can be arranged in an area outside of the display area D. For that reason, the liquid crystal display device 1 according to this embodiment can widely ensure the display area D, and realize a narrow frame.

Also, as illustrated in FIGS. 1 and 2, in the liquid crystal display device 1 according to this embodiment, an alignment mark part 40 may be formed in the non-display area E of the first substrate 12. The alignment mark part 40 is a portion different in infrared transmittance or infrared reflectance from the light impermeable film BM, and disposed inside of the light impermeable film BM in the planar view.

As illustrated in FIG. 3, the alignment mark part 40 according to this embodiment is formed by forming a colored film 44 (R) within an alignment mark opening 42 that exposes a lower surface of the glass substrate 112, which is formed in the light impermeable film BM. It is preferable that the colored film 44 formed within the alignment mark part 40 has the same color as the red colored film R of the color filter CF.

The alignment mark opening 42 is formed by sputtering a material of the light impermeable film BM with the use of, for example, a mask. In FIG. 3, for convenience of the description, the upper polarizing plate 16 and the glass substrate 112 are omitted from illustration.

In the alignment mark part 40, an inside portion of the alignment mark opening 42 in the planar view may be different in the infrared transmittance or infrared reflectance from the light impermeable film BM. For example, an inside of the alignment mark opening 42 may be filled with a transparent resin. Also, nothing may be formed on the inside portion of the alignment mark opening 42.

In the liquid crystal display device 1 according to this embodiment, with the formation of the alignment mark part 40 in the non-display area E, even if the outer edge 18b of the lower polarizing plate 18 is configured to be located outside of the outer edge 14b of the second substrate 14, the liquid crystal display panel 10 may be aligned with the backlight 20 with high precision.

The infrared transmittance or infrared reflectance of the alignment mark part 40 is different from the infrared transmittance or infrared reflectance of the light impermeable film BM. For that reason, when the upper polarizing plate 16 is irradiated with infrared rays from above, and observed by, for example, a CCD camera, a boundary (alignment mark opening 42) between the alignment mark part 40 and the light impermeable film BM can be visually recognized.

In the liquid crystal display device 1 according to this embodiment, the liquid crystal display panel 10 and the backlight 20 are aligned with each other with the use of the alignment mark part 40. For that reason, as compared with the liquid crystal display device without this configuration, the alignment is performed inexpensively. For that reason, the liquid crystal display device 1 low in the costs can be provided.

It is preferable that a planar view shape of the alignment mark is formed in a cross shape as illustrated in FIG. 3. Since the planar view shape of the alignment mark part 40 is a cross-shaped, the position of the alignment mark part 40 is likely to be accurately visually recognized. In addition, the planar view shape of the alignment mark part 40 is not limited to the cross shape, but may be formed in other shapes such as a linear, rectangular or ring shape.

The size of the alignment mark part 40 is not particularly limited, but preferably as small as possible within a range visibly recognizable with the use of the camera. The alignment mark part 40 according to this embodiment is, for example, 150 μm in width d1 in an X-direction and a Y-direction, and 50 μm in length d2 of short sides.

As illustrated in FIG. 3, it is preferable that the alignment mark part 40 is formed with a second alignment mark part 46 different in the infrared transmittance or infrared reflectance from the alignment mark part 40 on the inside thereof in the planar view. The planar view shape of the second alignment mark part 46 in this embodiment is a cross shape smaller than the alignment mark part 40. The planar view shape of the second alignment mark part 46 may be other shapes if the alignment mark opening 42 can be visibly recognized in the planar view.

The second alignment mark part 46 in this embodiment is obtained by sputtering a material of the light impermeable film BM, for example, with the use of a mask. The material of the second alignment mark part 46 is not limited to the light impermeable film BM. The second alignment mark part 46 may be made of other materials if the second alignment mark part 46 is made of a material different in the infrared transmittance or infrared reflectance of the alignment mark part 40 (area inside of the alignment mark opening 42).

In the liquid crystal display device 1 according to this embodiment, the second alignment mark part 46 different in the infrared transmittance or infrared reflectance from the alignment mark part 40 is formed inside of the alignment mark part 40 in the planar view. For that reason, as compared with the liquid crystal display device without this configuration, the liquid crystal display panel 10 and the backlight 20 are aligned with each other with high precision.

In addition, it is preferable that the alignment mark parts 40, as illustrated in FIG. 1, are formed at least two places at least along long sides of the outer edge 18b of the lower polarizing plate 18. The respective alignment mark parts 40 in this embodiment are formed in the vicinity of both ends of the outer edge 18b extending in the Y-direction. Also, as illustrated in FIG. 1, the alignment mark parts 40 may be located on a diagonal line on the outer edge 18b of the lower polarizing plate 18.

Figure 4:
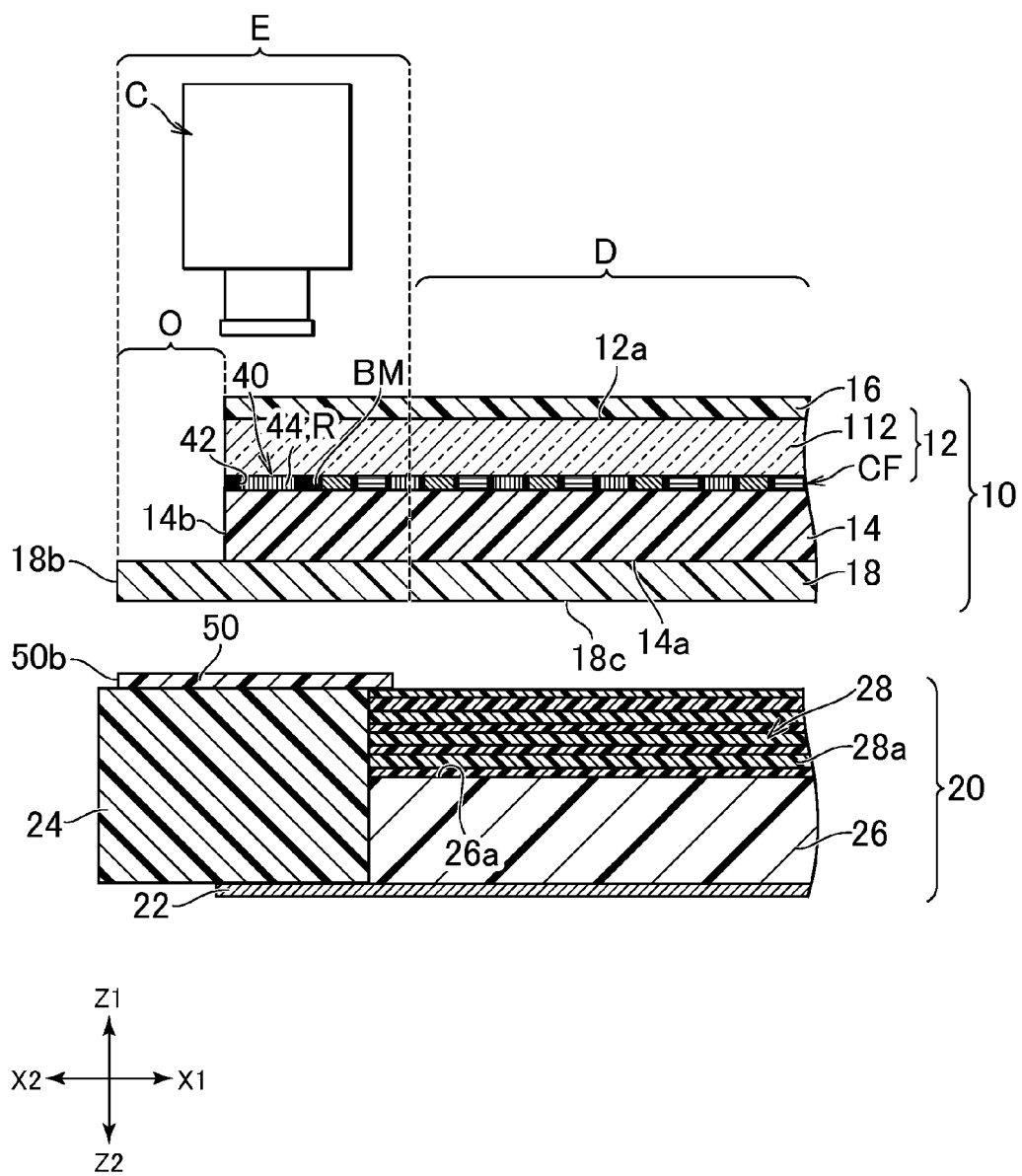
FIG. 4 is a schematic cross-sectional view illustrating a method of manufacturing the liquid crystal display device according to this embodiment in the same visual view as that of FIG. 2.

Next, a method of manufacturing the liquid crystal display device 1 according to the embodiment of the present invention will be described with reference to FIG. 4. FIG. 4 is a schematic cross-sectional view illustrating a method of manufacturing the liquid crystal display device 1 according to this embodiment in the same visual field as that of FIG. 2.

The method of manufacturing the liquid crystal display device 1 illustrated in FIGS. 1 and 2 includes a step of providing the backlight 20, a step of providing the liquid crystal display panel 10, and an adhesion step of adhering the backlight 20 and the liquid crystal display panel 10 with the adhesive layer 50. Hereinafter, those respective steps will be described in detail.

First, the backlight 20 is prepared. As illustrated in FIG. 4, the backlight 20 includes the reflection sheet 22, the frame 24, the light guide plate 26, and the optical member 28.

The light emitting elements not shown are arranged on a side surface of the light guide plate 26. With this configuration, the upper surface 26a of the light guide plate 26 functions as a surface light source. The optical member 28 is formed by laminating the plural optical sheets 28a. The optical member 28 is arranged to cover the upper surface 26a of the light guide plate 26.

Then, the liquid crystal display panel 10 is prepared. As illustrated in FIG. 4, the liquid crystal display panel 10 according to this embodiment includes the first substrate 12, the liquid crystal not shown, the second substrate 14, the upper polarizing plate 16, and the lower polarizing plate 18.

The first substrate 12 includes the display area D and the non-display area E. The display area D is formed with the color filter CF having, for example, the red colored film R, the green colored film G, and the blue colored film B. The respective colored films R, G, and B are sectioned in a matrix by the light impermeable film BM.

The non-display area E of the first substrate 12 is formed with the light impermeable film BM, and the alignment mark part 40 different in infrared transmittance or infrared reflectance from the light impermeable film BM. For convenience of description, the detailed configuration of the alignment mark part 40 will be described later.

The second substrate 14 faces the first substrate 12. The liquid crystal not shown is sandwiched between the second substrate 14 and the first substrate 12.

The upper surface 12a of the first substrate 12 is stuck with the upper polarizing plate 16. The lower surface 14a of the second substrate 14 is stuck onto the lower polarizing plate 18 larger in the planar view shape than the second substrate 14. As illustrated in FIG. 4, the outer edge 18b of the lower polarizing plate 18 is located outside (X2-direction side) of the outer edge 14b of the second substrate 14.

Next, the detailed configuration of the non-display area E of the first substrate 12 will be described. It is preferable that, as illustrated in FIG. 3, the alignment mark part 40 formed on the light impermeable film BM is formed by forming the colored film 44 within the alignment mark opening 42 in which a part of the light impermeable film BM is removed.

The alignment mark opening 42 is formed by sputtering a material of the light impermeable film BM with the use of a mask having a desired planar view shape, for example, in forming the light impermeable film BM in the display area D and the non-display area E.

It is preferable that the colored film 44 formed within the alignment mark opening 42 has the same color (red in this embodiment) as that of the colored film R of the color filter CF. However, the colored film 44 may be other colors such as colorless. Also, in the alignment mark part 40, the inside portion of the alignment mark opening 42 may be different in infrared transmittance or infrared reflectance from the light impermeable film BM. For example, nothing may be formed inside of the alignment mark opening 42.

It is preferable that the planar view shape of the alignment mark part 40 is a cross shape as illustrated in FIG. 3. The planar view shape of the alignment mark part 40 is not limited to the cross shape, but may be other shapes such as a linear, rectangular, or circular shape.

As illustrated in FIG. 3, it is preferable that the alignment mark part 40 is formed with the second alignment mark part 46 different in infrared transmittance or infrared reflectance from the alignment mark part 40 on the inside thereof in the planar view. The planar view shape of the second alignment mark part 46 in this embodiment may be a cross shape smaller than the alignment mark part 40, but may be other shapes.

The second alignment mark part 46 in this embodiment is formed by sputtering the light impermeable film BM with the use of, for example, a mask. The material of the second alignment mark part 46 is not limited to the light impermeable film BM, but may be other materials if the second alignment mark part 46 is made of a material different in infrared transmittance or infrared reflectance from the alignment mark part 40 (area inside of the alignment mark opening 42).

In addition, it is preferable that the alignment mark parts 40, as illustrated in FIG. 1, are formed in at least two places at least along the long sides of the outer edge 18b of the lower polarizing plate 18. The respective alignment mark parts 40 in this embodiment are formed in the vicinity of both ends of the outer edge 18b extending in the Y-direction. Also, as illustrated in FIG. 1, the alignment mark parts 40 may be located on a diagonal line of the outer edge 18b of the lower polarizing plate 18.

Next, an adhesion process of adhering the backlight 20 and the liquid crystal display panel 10 to each other with the adhesive layer 50 will be described in detail. First, at least a part of the adhesive layer 50 is arranged to overlap with the area outside of the outer edge 14b of the second substrate 14 on the backlight 20 in the planar view.

As illustrated in FIG. 4, specifically, when the backlight 20 adheres to the liquid crystal display panel 10, the adhesive layer 50 is arranged on the frame 24 in advance so that the outer edge (outer edge on the X2-direction side in FIG. 2) 50b of the adhesive layer 50 is located outside (X2-direction side) of the outer edge 14b of the second substrate 14.

With the above configuration, a part of the adhesive layer 50 overlaps with the lower polarizing plate 18 in the area O outside of the outer edge 14b of the second substrate 14 in the planar view.

Then, the backlight 20 is aligned with the liquid crystal display panel 10. First, as illustrated in FIG. 4, the liquid crystal display panel 10 is arranged between a camera C that can sense infrared rays and the backlight 20 which are fixed at given positions. The camera C may be, for example, a CCD camera.

For example, an observer visually recognizes the position of the alignment mark part 40 by the camera C while the liquid crystal display panel 10 is irradiated with the infrared rays from above (Z1-direction).

In this situation, the infrared rays with which the liquid crystal display panel 10 is irradiated from above are transmitted through the upper polarizing plate 16 and the glass substrate 112 to reach the alignment mark part 40 and the light impermeable film BM. The inner portion of the alignment mark opening 42 (in this embodiment, the colored film 44(R)) is different in infrared transmittance or infrared reflectance from the light impermeable film BM. For that reason, the alignment mark opening 42 which is the boundary between the colored film 44 and the light impermeable film BM can be visually recognized by the observer.

In addition, it is preferable that the planar view shape of the alignment mark part 40 is cross. The alignment mark part 40 having the cross planar view shape includes an intersection portion of two rectangles (a center portion 40a of the alignment mark part 40), and portions (line segment portions 40b of the alignment mark part 40) outside of the center portion 40a.

Also, it is preferable that the second alignment mark part 46 is formed inside of the alignment mark part 40. It is preferable that the planar view shape of the second alignment mark part 46 is a cross. The second alignment mark part 46 having the cross planar view shape includes an intersection portion (a center portion 46a of the second alignment mark part 46) of two rectangles, and portions (line segment portions 46b of the second alignment mark part 46) outside of the center portion 46a.

The second alignment mark part 46 is different in infrared transmittance or infrared reflectance from the alignment mark part 40 (colored film 44 which is a portion inside of the alignment mark opening 42). For that reason, as illustrated in FIG. 3, a boundary 48 between the colored film 44 and the second alignment mark part 46 can be visually recognized with the irradiation of the infrared rays by the observer.

With the irradiation of the liquid crystal display panel 10 with the infrared rays, the observer can visually recognize the alignment mark part 40 through the upper polarizing plate 16 by the camera C. As a result, the observer can align the liquid crystal display panel 10.

In this case, the observer observes images taken by the camera C, and as illustrated in FIG. 3, positions the liquid crystal display panel 10 so that the center of the alignment mark part 40 is aligned with a given position of the screen. If the planar view shape of the alignment mark part 40 is a cross, it is preferable to perform alignment so as to locate the center portion 40a at the given position on the screen. Also, the alignment may be performed so that the line segment portions 40b are located at the given position on the screen.

When the second alignment mark part 46 is formed inside of the alignment mark part 40, it is preferable that the alignment is performed so that the center portion 46a of the second alignment mark part 46 is located at the given position on the screen, as illustrated in FIG. 3. Alternatively, the alignment may be performed so that the line segment portions 46b are located at the given position on the screen.

After the alignment of the liquid crystal display panel 10 has been thus performed, the liquid crystal display panel 10 moves down (Z2-direction indicated in FIG. 4), and the lower surface (lower surface 18c of the lower polarizing plate 18) of the liquid crystal display panel 10 is adhered to the adhesive layer 50. As a result, the liquid crystal display panel 10 is adhered to the backlight 20 with the adhesive layer 50.

Thereafter, with the provision of the flexible wiring substrate 2 and the driver IC 3, the liquid crystal display device 1 illustrated in FIGS. 1 and 2 is manufactured.

In the method of manufacturing the liquid crystal display device 1 according to this embodiment, the outer edge 18b of the lower polarizing plate 18 is located outside of the outer edge 14b of the second substrate 14, and the adhesive layer 50 is arranged so that at least a part of the adhesive layer 50 overlaps with the area O outside of the outer edge 14b of the second substrate 14 in the planar view. As a result, as compared with the liquid crystal display device without this configuration, the adhesive layer 50 can be arranged in the outside area. Specifically, the outer edge 50b of the adhesive layer 50 is located outside (X2-direction side) of the outer edge 14b of the second substrate 14.

For that reason, the method of manufacturing the liquid crystal display device 1 according to this embodiment can provide the liquid crystal display device 1 that can ensure the display area D widely, and can realize a narrow frame.

Also, in the method of manufacturing the liquid crystal display device 1 according to this embodiment, since the alignment mark part 40 formed in the non-display area E is irradiated with infrared rays, even in the configuration where the outer edge 18b of the lower polarizing plate 18 is located outside of the outer edge 14b of the second substrate 14, the liquid crystal display panel can be aligned while the alignment mark part 40 is visually recognized. For that reason, the liquid crystal display panel 10 can be aligned with the backlight 20 with high precision.

Also, in the method of manufacturing the liquid crystal display device 1 according to this embodiment, since the alignment mark part 40 has the alignment mark opening 42 formed by removing a part of the light impermeable film BM, the alignment mark opening 42 can be formed in the non-display area E at the same time when forming the light impermeable film BM.

Also, in the method of manufacturing the liquid crystal display device 1 according to this embodiment, the colored film 44 is formed within the alignment mark opening 42 at the same time when forming the colored films R, G, and B in the display area D. As a result, the alignment mark part 40 can be formed at the same time when forming the color filter CF in the display area D. For that reason, there can be provided the inexpensive liquid crystal display device 1 that can obtain the advantages of the present invention without any increase in the processes and the costs.

Also, in this embodiment, since the alignment mark part 40 having the cross planar view shape is formed, the observer can align the liquid crystal display panel 10 while recognizing an allowable range (line segment portions 40b) of the position of the alignment mark part 40, and the preferable position (center portion 40a). For that reason, as compared with the manufacturing method without this configuration, a precision in the alignment of the liquid crystal display panel 10 can be enhanced.

Also, in this embodiment, the second alignment mark part 46 is formed inside of the alignment mark part 40 in the planar view. As a result, the liquid crystal display panel 10 can be aligned with the backlight 20 with the use of the second alignment mark part 46 in addition to the alignment mark part 40. For that reason, as compared with the method of manufacturing the liquid crystal display device without this configuration, the alignment higher in precision can be realized.

Also, in this embodiment, since the planar view shape of the second alignment mark part 46 is a cross, the observer can align the liquid crystal display panel 10 while recognizing the allowable range (line segment portions 46b) of the position of the second alignment mark part 46, and the preferable position (center portion 46a). For that reason, as compared with the manufacturing method without this configuration, a precision in the alignment of the liquid crystal display panel 10 can be enhanced.

Also, in this embodiment, since the red colored film R is formed within the alignment mark opening 42, with the irradiation of the infrared rays, the alignment mark part 40 can be easily visually recognized.

The embodiments of the present invention have been described above. However, the present invention is not limited to the above embodiments. For example, the configurations described in the above embodiments may be replaced with substantially identical configurations, configurations having the same effects, or configurations that can achieve the same purpose.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
a liquid crystal display panel having a first substrate and a second substrate with a display area and a non-display area;
a backlight that irradiates the liquid crystal display panel with light;
an adhesive layer that adheres the liquid crystal display panel to the backlight;
a first polarizing plate stuck onto the first substrate; and
a second polarizing plate stuck onto the second substrate, wherein
an outer edge of the second polarizing plate is located outside an outer edge of the second substrate,
the second polarizing plate has a protruding portion extending from the outer edge of the second substrate to the outer edge of the second polarizing plate, the protruding portion of the second polarizing plate being fixed to the backlight with the adhesive layer,
a light impermeable film and an alignment mark part are formed in the non-display area of the first substrate and are covered with the first polarizing plate, and
the light impermeable film and the alignment mark part are different in infrared transmittance or infrared reflectance.

2. The liquid crystal display device according to claim 1, wherein
a color filter having a colored film is disposed in the display area of the first substrate, and
the colored film is formed in the alignment mark part.

3. The liquid crystal display device according to claim 1, wherein
a second alignment mark part different in the infrared transmittance or infrared reflectance from the alignment mark part is formed inside the alignment mark part in a planar view.

4. A liquid crystal display device, comprising:
a liquid crystal display panel having a first substrate and a second substrate with a display area and a non-display area;
a backlight;
an adhesive layer that adheres the liquid crystal display panel to the backlight;
an opaque film formed in the non-display area of the first substrate;
an upper polarizing plate stuck onto the first substrate; and
a lower polarizing plate stuck onto the second substrate, wherein
an outer edge of the lower polarizing plate is located outside an outer edge of the second substrate,
the lower polarizing plate has a protruding portion extending from the outer edge of the second substrate to the outer edge of the lower polarizing plate, the protruding portion of the lower polarizing plate being fixed to the backlight with the adhesive layer,
at least a part of the adhesive layer is arranged to overlap with an area outside of the outer edge of the second substrate in a planar view, and
an opening is formed in the opaque film and overlapped with the upper polarizing plate.

5. The liquid crystal display device according to claim 4, wherein
a colored film different in an infrared transmittance or infrared reflectance from the opaque film is formed within the opening.

6. The liquid crystal display device according to claim 4, wherein the opening is an alignment mark part.

7. The liquid crystal display device according to claim 5, wherein a color filter having a colored film is formed in the display area, and
the colored film formed within the opening is made of the same material as that of the colored film of the color filter.

* * * * *